United States Patent [19]

Gorin

[11] 4,081,400
[45] Mar. 28, 1978

[54] REGENERATION OF ZINC HALIDE CATALYST USED IN THE HYDROCRACKING OF POLYNUCLEAR HYDROCARBONS

[75] Inventor: Everett Gorin, San Rafael, Calif.

[73] Assignee: Continental Oil Company, Stamford, Conn.

[21] Appl. No.: 764,616

[22] Filed: Feb. 1, 1977

[51] Int. Cl.$^2$ ............................................. B01J 27/32
[52] U.S. Cl. ................................... 252/415; 252/416; 423/107; 423/491; 208/10; 208/108
[58] Field of Search .................. 252/415, 416; 208/10, 208/108; 423/107, 491

[56] References Cited

U.S. PATENT DOCUMENTS 3,355,376  11/1967  Gorin et al. ............................ 208/10
3,888,302  6/1975  Rounds ................................. 423/107

FOREIGN PATENT DOCUMENTS 1,095,851  12/1967  United Kingdom ................... 208/10

Primary Examiner—Winston A. Douglas
Assistant Examiner—P. E. Konopka
Attorney, Agent, or Firm—D. Leigh Fowler, Jr.; William A. Mikesell, Jr.; F. Lindsey Scott

[57] ABSTRACT

Improved recovery of spent molten zinc halide hydrocracking catalyst is achieved in the oxidative vapor phase regeneration thereof by selective treatment of the zinc oxide carried over by the effluent vapors from the regeneration zone with hydrogen halide gas under conditions favoring the reaction of the zinc oxide with the hydrogen halide, whereby regenerated zinc halide is recovered in a solids-free state with little loss of zinc values.

2 Claims, 1 Drawing Figure

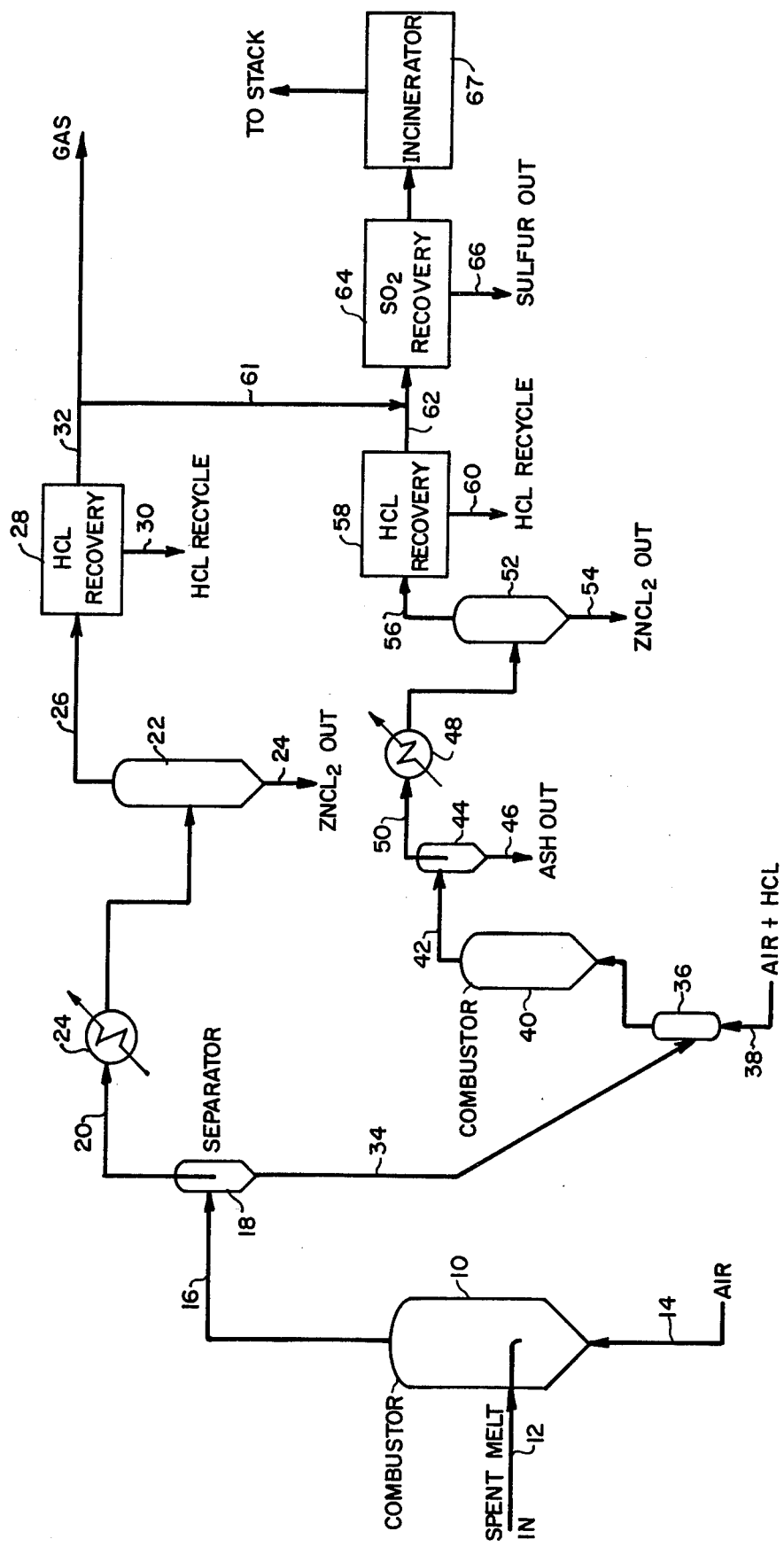

REGENERATION OF ZINC HALIDE CATALYST USED IN THE HYDROCRACKING OF POLYNUCLEAR HYDROCARBONS

The invention was made in the course of or under a contract with the Energy Research and Development Administration.

BACKGROUND OF THE INVENTION

This invention relates to the regeneration of molten zinc halide catalysts used in hydrocracking predominantly polynuclear aromatic hydrocarbonaceous materials; and, more particularly, in the conversion to gasoline of substantially non-distillable, high molecular weight, predominantly polynuclear aromatic hydrocarbonaceous feedstocks which contain nitrogen, oxygen and sulfur compounds. Examples of such feedstocks are coaly solids and pyrolytic products derived from coal solids such as coal extracts.

A process for utilizing molten zinc halide in such catalytic hydrocracking is described in British Pat. No. 1,095,851. As set forth in that patent, it was found that polynuclear hydrocarbons, even those which are non-distillable, may be readily converted in the presence of a large quantity of molten zinc halide to low boiling liquids suitable for fuels such as gasoline. The amount of zinc halide which serves as catalyst must be at least 15 weight percent of the inventory of hydrocarbonaceous material in the hydrocracking zone. To this amount of zinc halide must be added, in the case of nitrogen- and sulfur-containing feedstock, sufficient zinc halide to remove reactive nitrogen and sulfur compounds in the feedstock, in accordance with the following equations in the case of zinc chloride:

$$ZnCl_2 + H_2S = ZnS + HCl \quad (1)$$

$$ZnCl_2 + NH_3 = ZnCl_2 \cdot NH_3 \quad (2)$$

$$ZnCl_2 \cdot NH_3 + HCl = ZnCl_2 \cdot NH_4Cl \quad (3)$$

In the case of a feedstock consisting of coal extract containing, for example, 1.5 percent N and 2 percent S, the amount of zinc chloride required to react stoichiometrically with the nitrogen and sulfur compounds would be 23 percent by weight of the feedstock.

Again, using zinc chloride as illustrative of the zinc halides, the spent zinc chloride melt from the hydrocracking zone contains (in addition to zinc chloride) zinc sulfide (see Equation 1), $ZnCl_2 \cdot NH_3$ (see Equation 2), organic residue, and generally ash, as well as zinc oxide if the latter were used as an HCl acceptor. U.S. Pat. No. 3,355,376 describes two methods of regenerating the spent zinc halide melt, both involving oxidation of the impurities, one in liquid phase and one in vapor phase. The reactions occurring in such oxidative regenerative processes in the case of zinc chloride are set forth in the following equations:

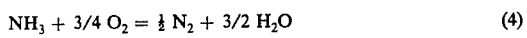

$$NH_3 + 3/4\, O_2 = \tfrac{1}{2} N_2 + 3/2\, H_2O \quad (4)$$

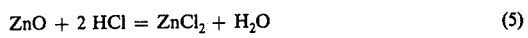

$$ZnO + 2\, HCl = ZnCl_2 + H_2O \quad (5)$$

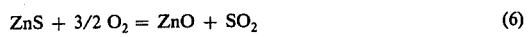

$$ZnS + 3/2\, O_2 = ZnO + SO_2 \quad (6)$$

$$C + O_2 = CO_2 \quad (7)$$

$$C + \tfrac{1}{2} O_2 = CO \quad (8)$$

In vapor phase oxidation, air is used to effect combustion of the organic residue, to thereby establish and maintain a temperature in the regenerator at which zinc chloride is vaporized. The effluent zinc chloride vapors carry with them zinc values in the form of "free" zinc oxide and zinc oxide chemically combined with acidic oxides such as silica found in the ash of coaly solids.

The primary object of the present invention is to provide a process for regenerating spent zinc halide in which the loss of zinc values in a vapor phase oxidative regenerative process is minimized.

The following patents were considered in the preparation of this application:
- Br. Pat. No. 1,095,851
- U.S. Pat. No. 3,355,376
- U.S. Pat. No. 3,371,049
- U.S. Pat. No. 3,594,329
- U.S. Pat. No. 3,625,861
- U.S. Pat. No. 3,629,159

SUMMARY OF THE INVENTION

The improved regeneration process of my invention comprises four steps. In the first step, the spent zinc halide melt from the hydrocracking zone is subjected to vapor phase oxidative treatment by combustion of the carbon and sulfur components, as well as any ammonia that may be present. In this step, the temperature is maintained at least high enough to assure vaporization of the zinc halide. The effluent vapors contain solids composed of zinc oxide and zinc oxide complexes, along with inorganic ash that may be in the spent melt, as well as residual organic residue. The second step of the process consists of the separation of the zinc halide vapors from the solids by any conventional means, generally a cyclone. The third step consists of the treatment of the separated solids with hydrogen halide gas under conditions favoring the reaction of zinc oxide and the hydrogen halide at a temperature sufficiently high to form zinc halide in the vapor state. In the fourth step, vaporous zinc halide is separated from the ash and condensed to the molten state for recycle to the hydrocracking zone.

DESCRIPTION OF THE DRAWING

The drawing is a schematic flowsheet of the preferred embodiment of the regeneration process of the present invention.

PREFERRED EMBODIMENT

Referring to the drawing, spent zinc chloride melt is fed to a Combustor 10 through a conduit 12. The spent zinc chloride melt resulting from the hydrocracking of coal or coal derived products contains in addition to zinc chloride carbonaceous residue as well as ash, sulfur, and nitrogen components. The carbon, sulfur and nitrogen components in the spent catalyst are oxidized by air fed to the Combustor via a conduit 14. The air is preferably enriched with oxygen, and also contains a low concentration of HCl to aid in preventing hydrolysis of zinc chloride by steam. The combustion conducted in the Combustor may be either with less than or greater than, the stoichiometric amount of air. In the former case, fuel gas will be produced; in the latter case, flue gas. Heat is generated in the Combustor by oxidation of the carbon contained in the spent melt, and is sufficient to maintain the temperature in the Combustor above the vaporization temperature of zinc chloride. The latter, in vapor form, together with steam, non-condensable gases, N, CO and $CO_2$, unreacted HCl, and entrained solids, is withdrawn from the Combustor 10 through a conduit 16 to a hot Separator 18 which is any cyclone commonly used for the separation of gases and solids at high temperature. In this instance, the temperature of the cyclone is not permitted to drop below the condensation point of zinc chloride.

Zinc chloride and water vapors and non-condensable gases CO, $CO_2$, $N_2$ and HCl are withdrawn from the Separator 18 through a conduit 20 to a condenser 22 for selective condensation after passing through a pre-cooler 24. Zinc chloride condensate in molten form is discharged from the condenser 22 through a conduit 24 for return to the hydrocracking zone (not shown). The non-condensable gases are withdrawn from the condenser through conduit 26 to a suitable HCl recovery zone 28 from which HCl is recovered through conduit 30 for reuse in the process. A gas is withdrawn from the HCl recovery zone through conduit 32 which is a low sulfur fuel gas whenever sub-stoichiometric quantities of air are used in Combustor 10.

The solids discharged from the hot Separator 18 are conducted by a conduit 34 to a premixer and preheater 36 where the solids are mixed with a stream of HCl-containing gas introduced through a conduit 38. The gas may conveniently be air or combustion gases. The mixture of gases and entrained solids is transferred to a second Combustor 40 where the zinc oxide and zinc oxide complexes are converted to zinc chloride by reaction with HCl. The temperature of the Combustor is maintained above the vaporization temperature of zinc chloride by the oxidation of carbon in the case where oxygen is contained in the HCl-containing gas. The carbon is that contained in the unconsumed organic residue carried over from the first Combustor or is added as required to the second Combustor expressly for that purpose. Such added or supplemental carbon may be in the form of coal.

Zinc chloride vapors, ash and non-condensable gases are withdrawn from the Combustor 40 through a conduit 42 to a hot cyclone Separator 44 where the ash is rejected through a line 46. The vapors and gases pass through a pre-cooler 48 in a conduit 50 to a condenser 52 adapted to selectively condense zinc chloride in molten form. The molten zinc chloride is withdrawn through line 54 for recycle. The non-condensable gas is withdrawn through a conduit 56 to a suitable HCl recovery zone 58 for recovery of HCl through a conduit 60. The HCl-free gas, together with any sulfur-rich gas withdrawn from conduit 32 through a conduit 61, is conducted through a conduit 62 to an $SO_2$-reduction zone 64 for conversion of $SO_2$ in the gas to elemental sulfur. The amount of $SO_2$ in conduit 32 and in conduit 62 is a function of the amount of air used in Combustor 10, the larger the amount of air, the greater the amount of $SO_2$ in conduit 32, and conversely the smaller the amount, the larger the amount in conduit 62. In either case, it is desirable to recover such $SO_2$ as sulfur. The CO and $H_2$ contained in the gas provides a suitable source of reducing agent for $SO_2$ reduction. The sulfur product is recovered through a conduit 66. The remaining gas may be incinerated in an incinerator 67 to remove residual sulfur compounds.

EXPERIMENTAL SECTION

The spent melt used in the experimental program on the regeneration process of this invention which is reported below was produced in the following manner. The spent melt was a low-carbon melt (ca. 7 wt. % $C_1$) which was obtained by a series of direct hydrocracking runs on Colstrip coal in the presence of molten $ZnCl_2$. The following nominal conditions are those of a typical run.

| | |
|---|---|
| Temperature | 775° F. |
| Total pressure | 3500 psig |
| $ZnCl_2$/Vehicle-free Coal, wt. ratio | 1.5 |
| $H_2$ Rate, SCF/lb. total org. feed | 30 |
| Coal Slurry Composition*, Wt.% | |
| —100 Mesh Colstrip Coal | 30 |
| Vehicle, 8% w/polystyrene in benzene | 70 |
| Bed Inventory, lb. | 2.26 |
| Melt Production Rate, lb/hr. | 1.34 |
| Melt Residence Time, hr. | 1.7 |
| Total Run Time, hr. | 50.7 |
| Material Balance Time, hr. | 6.0 |

*A slurry of the —100 mesh coal in 8% w/polystyrene in benzene served as the feed to the hydrocracking zone.

A composite of the spent melts from the several hydrocracking runs made on the Colstrip coal had the following elemental analysis:

| | |
|---|---|
| H | 0.77 |
| C | 7.04 |
| N | 0.61 |
| O (by diff.) | 1.56 |
| Organic S | 0.03 |
| Sulfide S | 0.35 |
| Zn | 41.22 |
| Cl | 41.23 |
| Ash (as oxides) | 7.19 |

Spent melt of the foregoing analysis was subjected to treatment in a vapor phase combustion zone in a typical run under the following conditions: temperature at 1700° F., pressure at 3 psig, HCl in the feed air at 5.5 volume %, air at 115% of stoichiometric, and superficial linear velocity at 1 fps. A 28×48 mesh silica bed was used in a fluo-solids combustor, as described in U.S. Pat. No. 3,594,329. The results obtained were as follows:

| | |
|---|---|
| Percent $NH_3$ decomposed | 100 |
| Percent C burned to CO + $CO_2$ | 98 |
| Percent inorganic S burned to $SO_2$ | 93 |
| Exit gas, vol. percent: | |
| $CO_2$ | 8.78 |
| CO | 1.25 |
| $H_2$ | 0.00 |
| $SO_2$ | 0.29 |
| Argon + $N_2$ | 73.75 |
| $O_2$ | 3.83 |
| HCl | 4.45 |
| $H_2O$ | 7.65 |

The following briefly describes experimental work performed on the recovery of zinc from the cyclone underflow ash, that is, the ash issuing through conduit 34 from the Separator 18 shown in the accompanying drawing. The ash actually used in these studies was the cyclone underflow from the regeneration run cited above. The experimental work consisted of passing a continuous stream of gas over a sample of ash (cyclone underflow solids) contained in a ceramic boat in a ceramic tube at elevated temperatures. The object was to convert any zinc in the form of zinc oxide, zinc aluminate, zinc silicate, or other zinc compounds, to volatile zinc chloride which would be evaporated from the ash and recovered as zinc chloride. The three named compounds would be found in the cyclone ash as a result of the following equilibria:

$$ZnCl_2 + H_2O = ZnO + 2 HCl$$

$$ZnCl_2 + H_2O + SiO_2 = ZnO.SiO_2 + 2 HCl$$

$$ZnCl_2 + H_2O + Al_2O_3 = ZnO.Al_2O_3 + 2 HCl$$

The results obtained in two runs are presented in the following Table:

TABLE

| For both runs: | Feed Ash = combined cyclone underflow from Run 318.05-16. Pressure = atmospheric Gas Velocity in Reactor Tube at Temperature = 0.05 fps. Residence Time of Run (including 15 minute purge after completion of the run) = 2 hrs and 15 minutes. Wt. % Zinc in Feed Ash = 15.5. Wt. % Cl in Feed Ash = 6.27. Wt. % $Fe_2O_3$ in Feed Ash = 3.67. | |
| --- | --- | --- |
| Run No. | 1 | 2 |
| Temperature of the Boat, ° F. | 1400 | 1600 |
| Inlet Gas Composition, Mol % | | |
| Anhydrous HCl | 10 | 10 |
| Nitrogen | 90 | 90 |
| % Wt. Loss | 21.5 | 27.3 |
| % Zinc Removed from Feed Ash | 74.5 | 91.2 |
| Zinc Distribution, % of Feed Zinc | | |
| In Effluent Ash | 22.7 | 5.7 |
| In Scrubber Solution | 74.5 | 91.2 |
| Loss (by difference) | 2.8 | 3.1 |
| Zn Balance (Out/In) 100 | 97.2 | 96.9 |

According to the provisions of the patent statutes, the principle, preferred construction and mode of operation of the invention have been explained and what is considered to represent its best embodiment has been illustrated and described. However, it should be understood that, within the scope of the appended claims, the invention may be practiced otherwise than as specifically illustrated and described.

I claim:

1. A process for regenerating spent molten zinc chloride which has been used in the hydrocracking of coal or ash-containing polynuclear aromatic hydrocarbonaceous materials derived therefrom and which contains zinc chloride, zinc oxide, zinc oxide complexes and ash-containing carbonaceous residue, comprising in combination, the following steps:
    (a) subjecting said spent zinc chloride to vapor phase oxidative treatment by a mixture of air and hydrogen chloride gas to produce effluent zinc chloride vapors which contain entrained zinc oxide, zinc oxide complexes and residual ash-containing carbonaceous solids;
    (b) separating the zinc chloride vapors from the entrained solids;
    (c) subjecting the separated solids to vapor phase oxidative treatment by a mixture of air and hydrogen chloride gas to yield zinc chloride in vapor form; and
    (d) recovering said zinc chloride in a substantially solids-free molten state.

2. A process for regenerating spent molten zinc halide which has been used in the hydrocracking of coal or ash-containing polynuclear aromatic hydrocarbonaceous materials derived therefrom and which contains, in addition to zinc halide, zinc sulfide, organic residue and ash, comprising in combination, the following steps:
    (a) subjecting said spent zinc halide to vapor phase oxidative treatment by combustion of the carbon and sulfur components at a temperature maintained at least high enough to assure vaporization of the zinc halide, whereby effluent vapors are produced in which solids containing zinc oxide, zinc oxide complexes and ash are entrained;
    (b) separating the zinc halide vapors from said solids;
    (c) treating the separated solids with hydrogen halide gas under conditions favoring the reaction of zinc oxide and hydrogen halide at a temperature sufficiently high to form zinc halide in the vapor state; and
    (d) separating the vaporous zinc halide from the ash and condensing it to the molten state.

* * * * *

UNITED STATES PATENT OFFICE
CERTIFICATE OF CORRECTION

PATENT NO. : 4,081,400
DATED : March 28, 1978
INVENTOR(S) : Everett Gorin

It is certified that error appears in the above-identified patent and that said Letters Patent are hereby corrected as shown below:

In the drawing, Line 20, the reference numeral "24" should be changed to --21--.
In the specification, Column 3, line 12, the reference numeral "24" should be changed to --21--.

Signed and Sealed this

Twenty-fourth Day of October 1978

[SEAL]

Attest:

RUTH C. MASON
Attesting Officer

DONALD W. BANNER
Commissioner of Patents and Trademarks